United States Patent [19]

Auchter et al.

[11] Patent Number: 4,952,623
[45] Date of Patent: Aug. 28, 1990

[54] AQUEOUS POLYMER DISPERSIONS HAVING A LONG SHELF LIFE

[75] Inventors: Gerhard Auchter, Mannheim; Thomas Schwerzel; Rainer Blum, both of Ludwigshafen; Gerhard Neubert, Battenberg; Eckehardt Wistuba, Bad Duerkheim; Rolf Osterloh, Erftstadt, all of Fed. Rep. of Germany

[73] Assignee: BASF Aktiengesellschaft, Ludwigshafen, Fed. Rep. of Germany

[21] Appl. No.: 210,496

[22] Filed: Jun. 23, 1988

[30] Foreign Application Priority Data

Jun. 24, 1987 [DE] Fed. Rep. of Germany ....... 3720859

[51] Int. Cl.$^5$ .................. C08J 3/10; C08K 5/25; C08L 33/06; C09D 3/80
[52] U.S. Cl. .................. 524/517; 524/379; 524/522
[58] Field of Search ............ 524/517, 522, 379

[56] References Cited

U.S. PATENT DOCUMENTS

| | | | |
|---|---|---|---|
| 4,210,565 | 7/1980 | Emmons | 525/376 |
| 4,250,070 | 2/1981 | Ley et al. | |
| 4,256,809 | 3/1981 | Larsson et al. | 428/473 |
| 4,529,772 | 7/1985 | Droschke et al. | 428/507 |
| 4,786,676 | 11/1988 | Blum et al. | 525/328.7 |

FOREIGN PATENT DOCUMENTS

| | | |
|---|---|---|
| 0015644 | 9/1980 | European Pat. Off. . |
| 3536261 | 4/1987 | Fed. Rep. of Germany . |
| 1421130 | 7/1973 | United Kingdom . |
| 1530021 | 10/1978 | United Kingdom . |

OTHER PUBLICATIONS

Derwent Abs. 87-164397/24 DE 3543361 (6-1987) Auchter et al.
Derwent Abs. 85-03250J/06 DE-3325898 (1-85) Bunsch et al.
Patent Abstracts of Japan, vol. 6, No. 63 (C-99) (941) (4/22/82) European Search Reports.

*Primary Examiner*—Herbert J. Lilling
*Attorney, Agent, or Firm*—Keil & Weinkauf

[57] ABSTRACT

Aqueous polymer dispersions which have a long shelf life are obtainable by dispersing a mixture of 15–50% by weight of a copolymer (A) of (I) 1.5–15% by weight of copolymerizable compounds of 3 to 10 carbon atoms which contain a carboxyl or carboxylic anhydride group, (II) 30–98.5% by weight of $C_1$–$C_{20}$-alkyl acrylates or methacrylates, (III) 0–60% by weight of vinylaromatics, (IV) 0–20% by weight of copolymerizable carbonyl compounds and (V) 0–20% by weight of further copolymerizable organic compounds not stated under (I) to (IV) and 50–85% by weight of a copolymer (B) of 40–100% by weight of the monomers (II) and 0–60% by weight of the monomers (III) to (V), with the proviso that the copolymers (A) and (B) together contain, as components, up to 65% by weight of alkyl (meth)acrylates (II) whose homopolymers have glass transition temperatures of less than 0° C., and that one or both of the copolymers (A) and (B) contain the monomers (IV) as components, in water with the addition of ammonia and a polyhydrazide (C), and the said dispersions are used for the preparation of finishes and coatings.

2 Claims, No Drawings

AQUEOUS POLYMER DISPERSIONS HAVING A LONG SHELF LIFE

The present invention relates to aqueous polymer dispersions which have a long shelf life and are obtainable by dispersing a mixture of two copolymers, one or both of which contain a copolymerizable carbonyl compound as a component, in the presence of a polyhydrazide as a crosslinking agent, a process for the preparation of such dispersions and their use for the preparation of finishes and coating materials.

Aqueous polymer dispersions which contain carbonyl groups and can be crosslinked by means of polyhydrazides are known and are described in, for example, EP 0,003,516. These dispersions are prepared by the process of emulsion polymerization (primary dispersions are formed in this process), in which hydrophilic assistants (emulsifiers) are used, resulting in relatively high water absorption of the films produced from the dispersions.

German Laid-Open Application DOS 3,536,261 describes polymeric compositions which have a long shelf life in aqueous solutions or dispersions, are obtainable by reacting polymeric organic compounds containing carboxyl and carbonyl groups with polyhydrazides in the presence of monoketones and/or monoaldehydes and are soluble or dispersible in water after neutralization of some or all of the carbonyl groups. The dispersions prepared in this manner are referred to as secondary dispersions. In order to achieve an adequate shelf life, substantial amounts of volatile monoketones and/or monoaldehydes are required, which evaporate on drying. This is undesirable because of the odour and for toxicological reasons. Furthermore, because of the content of organic solvents, thick coatings dry out very slowly.

It is an object of the present invention to prepare aqueous polymer dispersions which have a long shelf life, are free of emulsifiers and of volatile monoketones and/or monoaldehydes and, on drying, give crosslinked, non-blocking films which cannot be completely dissolved again with organic solvents.

We have found that this object is achieved by aqueous polymer dispersions which have a long shelf life and which are obtainable by dispersing a mixture of 15–50% by weight of a copolymer (A) of
- (I) 1.5–15% by weight of copolymerizable compounds of 3 to 10 carbon atoms which contain a carboxyl or carboxylic anhydride group,
- (II) 30–98.5% by weight of $C_1$–$C_{20}$-alkyl acrylates or methacrylates,
- (III) 0–60% by weight of vinylaromatics,
- (IV) 0–20% by weight of copolymerizable carbonyl compounds and
- (V) 0–20% by weight of further copolymerizable organic compounds not stated under (I) to (IV) and 50–85% by weight of a copolymer (B) of
40–100% by weight of the monomers (II) and
0–60% by weight of one or more of the monomers (III) to (V), with the proviso that the copolymers (A) and (B) together contain, as components, up to 65% by weight of alkyl (meth)acrylates (II) whose homopolymers have glass transition temperatures of less than 0° C., and that one or both of the copolymers (A) and (B) contain the monomers (IV) as components, in water with the addition of ammonia and a polyhydrazide (C).

The present invention furthermore relates to a process for the preparation of the aqueous polymer dispersions and their use for the preparation of finishes and coating materials.

Regarding the components of the copolymers (A) and (B), the following may be stated:

Suitable components (I) are copolymerizable olefinically unsaturated organic compounds of 3 to 10 carbon atoms which contain one or more carboxyl or carboxylic anhydride groups, such as acrylic acid, methacrylic acid, maleic acid, itaconic acid and the anhydrides and half-esters of the dicarboxylic acids. The anhydride groups of the copolymers can be converted, prior to neutralization with ammonia, into the corresponding half-ester groups, for example by heating with glycol ethers or alcohols of 1 to 8 carbon atoms. Examples of such alcohols and glycol ethers are ethanol, isopropanol, butanol and butyl glycol. Preferred components (I) are acrylic acid, methacrylic acid and itaconic acid. Component (I) is present in copolymer (A) as copolymerized units in amounts of from 1.5 to 15, preferably from 5 to 12, % by weight.

Examples of suitable esters of acrylic acid or methacrylic acid (II) with straight-chain or branched monoalkanols of 1 to 20 carbon atoms are methyl acrylate, ethyl acrylate, isopropyl acrylate, methyl methacrylate, n-butyl acrylate, n-butyl methacrylate, isobutyl acrylate, isobutyl methacrylate, tert-butyl acrylate, 2-ethylhexyl acrylate, 2-ethylhexyl methacrylate, lauryl acrylate and mixtures of these. n-Butyl acrylate and methyl methacrylate are preferred. Component (II) is present in copolymer (A) in an amount of from 30 to 98.5, preferably from 45 to 95% by weight.

Vinylaromatics of 8 to 12 carbon atoms, such as styrene, methylstyrene, vinyltoluenes, tert-butylstyrene and halostyrenes, are used as component (III). Styrene is preferred. Component (III) can be present in copolymer (A) in an amount of up to 60% by weight. Where it is present, amounts of from 20 to 45% by weight have proven useful.

Suitable copolymerizable carbonyl-containing compounds (IV) are, for example, $\alpha,\beta$-monoolefinically unsaturated aldehydes and/or ketones, such as acrolein, methacrolein, vinyl alkyl ketones where alkyl is of 1 to 20 carbon atoms, formylstyrene (meth)acryloxyalkanals and -alkanones, whose preparation is described in, for example, German Laid-Open Application DOS 2,722,097, N-oxoalkyl (meth)acrylamides, as described in, inter alia, U.S. Pat. No. 4,226,007 and German Laid-Open Applications DOS 2,061,213 and DOS 2,207,209, for example N-3-oxobutylacrylamide and -methacrylamide, N-1,1-dimethyl-3-oxobutyl(meth)acrylamide, diacetone(meth)acrylamide and N-3-oxo-1,1-dibutyl-2-propylhexylacrylamide, and acetonyl and diacetone (meth)acrylate and acrylamidopivalaldehyde and mixtures of these comonomers. 3-Oxoalkyl (meth)acrylates and N-3-oxoalkyl(meth)acrylamides are preferred. Component (IV) can be present in copolymer (A) in an amount of up to 20% by weight. Where it is used, an amount of from 2 to 15% by weight is preferred.

Components (V) are further copolymerizable olefinically unsaturated compounds which are not stated under (I) to (IV). These are, for example, mono(meth)acrylates of alkanediols, such as hydroxyethyl and hydroxypropyl (meth)acrylate and butanediol mono(meth)acrylate, (meth)acrylamide and/or (meth)a- crylonitrile. These monomers can, if required, be used for obtaining specific properties. Other components (V) which may be present are: vinyl ethers, vinyl esters, diesters of maleic acid, itaconic acid, citraconic acid or mesaconic acid with monoalcohols of 1 to 20 carbon atoms which may or may not contain ether or thioether groups. Other suitable components (V) are monoolefins of 3 to 20 carbon atoms, such as propene, butene, pentene, hexene or isobutene, and diolefins, such as butadiene or isoprene. It is known that polar functional groups, such as those which may be present in component (V), for example hydroxyl or ether groups, additionally stabilize polymer dispersions. However, the novel dispersions do not require such additional stabilization. Polar groups present in component (V) may, however, have an adverse effect on the water resistance of the films obtained from the novel dispersions. In the preferred embodiment of the invention, component (V) is therefore not present.

Copolymer (B) does not contain component (I). Component (II) is present in copolymer (B) in an amount of from 40 to 100, preferably from 45 to 98%, by weight, while the remaining components (III) to (V) are present in an amount of from 0 to 60% by weight, preferably from 2 to 55% by weight where they are used.

The mixture of the copolymers consists of from 15 to 50, preferably from 25 to 50, % by weight of copolymer (A) and from 50 to 85, preferably from 50 to 75, % by weight of copolymer (B). In order that the polymer dispersions give non-tacky coatings after film formation, up to 65% by weight, based on the total amount of the components (I) to (V) used for the preparation of the copolymers (A) and (B), of alkyl (meth)acrylates (II) whose homopolymers have glass transition temperatures of less than 0° C. are used. The glass transition temperatures of homopolymers are stated in, for example, J. Brandrup and E.H. Immergut, Polymer Handbook, Wiley-Interscience, 2nd Edition, 1975, III-139 et seq.

Furthermore, either copolymer (A) or copolymer (B) or both copolymers contains or contain component (IV) to permit crosslinking by the polyhydrazides.

Copolymers (A) and (B) of the novel dispersions are advantageously prepared by polymerization in organic solution. The process of solution polymerization is in principle familiar to the skilled worker so that there is no need to describe here the conditions which are suitable for the particular components. The polymerization is advantageously carried out in the presence of from 0.3 to 5, preferably from 0.5 to 3, % by weight, based on the sum of the monomers, of free radical initiators, such as azobiscarboxamides, azobiscarbonitriles or peroxides, in general at from 50° to 150° C., preferably from 80° to 130° C., in the presence or absence of regulators, such as mercaptoethanol, tert-dodecyl mercaptan or diisopropylxanthogen disulfide, which may be present in amounts of from 0 to 3% by weight, based on the sum of the monomers. Suitable organic solvents are in principle all conventional solvents which dissolve the copolymer according to the invention. The presence of a solvent is not essential for stabilization and for achieving advantageous properties of the novel dispersions, and, for environmental protection reasons, it is therefore appropriate to choose a very low solvent content. Advantageously used solvents are those which, because of their boiling point and/or azeotrope formation with water, can readily be distilled off from the novel dispersions. Butanol, isobutanol, propanol, ethanol and toluene are particularly preferred.

It is not important per se whether component (A) is polymerized first, followed by component (B), or whether the converse procedure is adopted. In a preferred embodiment of the invention, however, component (A) is first polymerized and then component (B). Both components give a homogeneous mixture. The component prepared first is substantially, ie. more than 95%, preferably 99%, polymerized before polymerization of the second component is begun. Residual monomers from the first component, in particular monomers containing acidic groups, could cause a change in the composition of the second component, leading to a deterioration in the performance characteristics. Dispersions prepared similarly according to the invention from two copolymers (A) and (B) which are prepared separately and then mixed generally have less advantageous performance characteristics, for example poorer stability and less favorable flow behavior. Furthermore, mixing would entail an additional operation.

The solutions of the polymerized copolymers (A) and (B) are converted into dispersions by admixing ammonia and diluting with water, or the polymerized copolymer solution is slowly stirred into an aqueous ammonia solution and a dispersion obtained in this manner. The organic solvent is removed by distillation from the dispersions thus obtained, the resulting concentration being <5% by weight; the solvent can be recovered. The degree of neutralization of the novel dispersions is from 10 to 150%, preferably from 15 to 100%, particularly preferably from 40 to 70%. The pH of the dispersions can then be from about 6.8 to 10, preferably from 7.0 to 9. In order to achieve certain effects, a small proportion, advantageously not more than 25, preferably not more than 10, mol % of the ammonia required for neutralization can be replaced by organic amines, in particular triethylamine. Such additives may adversely affect the water resistance of the dispersion films. The degree of polymerization of the novel dispersion is expediently chosen so that the resulting viscosity is advantageous for the processor. The polymer content is therefore from 35 to 60, preferably from 40 to 55, % by weight.

Examples of suitable polyhydrazides (C) are dihydrazides of organic di- or oligocarboxylic acids. Examples are malonic, succinic, glutaric, adipic, pivalic, suberic, azelaic, sebacic, decanedioic, dodecanedioic, tridecanedioic, tetradecanedioic, pentadecanedioic, hexadecanedioic and 2-methyltetradecanedioic dihydrazide, methyl-, ethyl-, propyl-, butyl-, hexyl-, heptyl-, octyl-, 2-ethylhexyl-, nonyl-, decyl-, undecyl- and dodecylmalonic dihydrazide, methyl-, ethyl-, propyl-, butyl-, hexyl-, heptyl- and octylsuccinic dihydrazide, 2-ethyl-3-propylsuccinic and -glutaric dihydrazide, cyclohexanedicarboxylic and cyclohexylmethylmalonic dihydrazide, terephthalic, phenylsuccinic, cinnamylmalonic and benzylmalonic dihydrazide, pentane-1,3,5-tricarboxylic trihydrazide, hex-4-ene-1,2,6-tricarboxylic trihydrazide, 3-cyanopentane-1,3,5-tricarboxylic trihydrazide, dicyanofumaric dihydrazide and the di- and oligohydrazides of dimerized or oligomerized unsaturated fatty acids. Adipic dihydrazide is preferred.

The polyhydrazide is added to and stirred into the novel polymer dispersions advantageously after the excess organic solvent has been distilled off, in solid form or as an aqueous solution or suspension.

Despite the possible reaction between hydrazide and carbonyl groups, which leads to crosslinking, the novel dispersions surprisingly have a long shelf life, ie. they do not tend to form two phases even on prolonged storage, nor is there a significant change in the viscosity and film-forming behavior during storage.

However, after application to a substrate and drying, crosslinked films which are no longer completely soluble in solvents are obtained at as low as room temperature. Drying and crosslinking are accelerated by elevated temperatures. The water resistance of the dispersion films decreases slightly with increasing hydrazide content, based on the carbonyl component, but is substantially higher than that of a normal soap dispersion or protective colloid dispersion even when the ratio of the number of equivalents is 1, based on the carbonyl component. The dispersions can be processed using a conventional coating unit, and the viscosity can be adapted to the particular coating system by thickening with commercial thickeners or dilution with water.

They are suitable as protective and/or decorative coatings on hard and soft substrates, for example metal, leather, paper and/or plastics.

EXAMPLE 1

(a) Preparation of Copolymer (A)

440 g of ethanol and one third of a mixture of 880 g of styrene, 1,100 g of n-butyl acrylate, 220 g of acrylic acid, 66 g of tert-butyl peroctoate and 330 g of ethanol were initially taken in a reaction vessel and heated to the reflux temperature, and the remainder of the mixture was added uniformly in the course of 2.5 hours at this temperature. Polymerization was then carried out for a further 4 hours at the reflux temperature.

(b) Preparation of the Mixture of Copolymers (A) and (B)

50 g of ethanol and 486 g of the solution described under (a) were initially taken and heated to the reflux temperature. Thereafter, a mixture of 189 g of styrene, 275 g of n-butyl acrylate, 72 g of diacetone-acrylamide, 9.7 g of tert-butyl peroctoate and 49 g of ethanol was added uniformly in the course of 3 hours. Polymerization was then carried out for a further 5 hours at the reflux temperature, 2.2 g of tert-butyl peroctoate being added twice after intervals of 1 hour. The resulting polymer solution had a K value (according to DIN 53,726) of 31 and an acid number (according to DIN 53,402) of 30.4 mg of KOH/g of solid substance.

(c) Preparation of the Dispersions 32.8 g of 25% strength by weight aqueous ammonia solution were added to the mixture of copolymers (A) and (B) which was described under (b). 650 g of water were then added with vigorous stirring. 370 g of an ethanol/water mixture were then distilled off under reduced pressure from the resulting dispersion, 320 g of water being added during the distillation. When the distillation was complete, 35.2 g of adipic dihydrazide were added at room temperature and stirred in over 4 hours. The dispersion had the following data:

| Solids content: | 47.3% by weight |
| --- | --- |
| pH: | 8.4 |
| Ethanol content: | 1.3% by weight |
| Viscosity (rotational viscometer), 23° C.): | 250 mPa.s. |

A sample of the dispersion was applied to a glass plate and dried for 60 hours at room temperature. A 54 μm thick transparent film having a pendulum hardness (according to DIN 53,157) of 180 s was obtained; the film could not be completely dissolved again with acetone.

EXAMPLE 2

(a) Preparation of Copolymer (A)

231 g of isobutanol and half of a mixture of 165 g of methyl methacrylate, 120 g of n-butyl acrylate, 28 g of acrylic acid, 23 g of diacetoneacrylamide, 1.2 g of tert-butyl peroctoate, 1.2 g of tert-butyl perbenzoate and 25 g of isobutanol were initially taken in a reaction vessel and heated to the reflux temperature, and the remainder of the mixture was added uniformly in the course of 1 hour at the reflux temperature. Polymerization was then carried out for a further 2 hours at the reflux temperature.

(b) Preparation of a Mixture of Copolymers (A) and (B)

A mixture of 231 g of methyl methacrylate, 200 g of n-butyl acrylate, 33 g of diacetoneacrylamide, 5.6 g of tert-butyl peroctoate and 85 g of isobutanol was added uniformly to the solution described under (a) in the course of 2 hours at the reflux temperature. Polymerization was then carried out for a further 3 hours at the reflux temperature.

(c) Preparation of the Dispersion 25 g of 25% strength by weight aqueous ammonia solution were added to the mixture of copolymers (A) and (B) which was described under, (b). 1,300 g of water were then added with vigorous stirring. An isobutanol/water mixture was then distilled off under reduced pressure from the dispersion thus formed until the content of non-volatile components was 40% by weight. When the distillation was complete, 25.9 g of adipic dihydrazide were added at room temperature and stirred in over 2 hours. The dispersion had the following characteristic data:

| Solids content: | 40.3% by weight |
| --- | --- |
| pH: | 7.9 |
| Isobutanol content: | 1.3% by weight |
| Viscosity (rotational viscometer, 23° C.): | 850 mPa.s. |

A sample of the dispersion was applied to a glass plate by means of a knife coater and was dried for 60 hours at room temperature. A 60 μm thick transparent film having a pendulum hardness (according to DIN 53,157) of 128 s was obtained; the film could not be completely dissolved again with acetone.

EXAMPLE 3

(a) Preparation of the Copolymer (A)

440 g of ethanol and 944 g of a mixture of 836 g of styrene, 264 g of acrylic acid, 1,100 g of n-butyl acrylate, 66 g of tert-butyl peroctoate and 330 g of ethanol were initially taken in a reaction vessel and heated to the reflux temperature, and the remainder of the mixture was added uniformly in the course of 2.5 hours.

Polymerization was then carried out for a further 4 hours at the reflux temperature.

(b) Preparation of the Mixture of Copolymers (A) and (B)

714 g of the solution described under a) were heated to the reflux temperature. A mixture of 200 g of styrene, 240 g of n-butyl acrylate, 60 g of diacetoneacrylamide, 200 g of ethanol and 10 g of tert-butyl peroctoate was added dropwise in the course of 3 hours. Polymerization was then carried out for a further 3 hours at the reflux temperature.

(c) Preparation of the Dispersion 56.6 g of 25% strength by weight aqueous ammonia solution were added to the mixture of copolymers (A) and (B) which was described under (b). 980 g of water were then added with vigorous stirring. A dispersion was formed, from which 540 g of an ethanol/water mixture were distilled off under reduced pressure. When the distillation was complete, 15.4 g of adipic dihydrazide were stirred in, and the content of nonvolatile components was brought to 41.3% by weight with water. Further data of the dispersion:

pH: 8.4

Ethanol content: 0.8% by weight

Viscosity (rotational viscometer, 23° C.): 360 mPa.s.

A sample of the dispersion was applied to a glass plate by means of a knife coater and was dried for 60 hours at room temperature. The resulting film had a pendulum hardness (according to DIN 53,157) of 76 s and could not be completely dissolved with acetone.

We claim:

1. An aqueous polymer dispersion essentially free of emulsifiers and having a long shelf life, which is obtained by polymerizing a mixture of 15 to 50% by weight of a copolymer (A) of
   (I) 1.5 to 15% by weight of copolymerizable compounds of 3 to 10 carbon atoms which contains a carboxyl or carboxylic anhydride group,
   (II) 30 to 98.5% by weight of $C_1$–$C_{20}$-alkyl acrylates or methacrylates,
   (III) 0 to 60% by weight of vinylaromatics,
   (IV) 0 to 20% by weight of copolymerizable carbonyl compounds and
   (V) 0 to 20% by weight of further copolymerizable organic compounds not stated under (I) to (IV), and
   50 to 85% by weight of a copolymer (B) of 40 to 100% by weight of the monomers (II) and 0 to 60% by weight of one or more of the monomers (III) to (V),
   wherein the copolymers (A) and (B) together contain, as components, up to 65% by weight of alkyl (meth)acrylates (II) whose homopolymers have glass transition temperatures of less than 0° C., and wherein one or both of the copolymers (A) and (B) contain the monomers (IV) as components, in an organic solvent in a manner such that first one of the two copolymers (A) and (B) is prepared by polymerization of the components, the other copolymer is produced in the resulting polymer solution, then dispersing the polymer mixture in water by adding ammonia, distilling off the solvent and adding one or more polyhydrazides (C) to the dispersion.

2. The polymer dispersion of claim 1, obtainable by using from 0.1 to 1 equivalent of polyhydrazide (C) per equivalent of carbonyl groups in the copolymer mixture (A) and (B).

* * * * *